(12) United States Patent
Eluripati et al.

(10) Patent No.: US 7,823,390 B2
(45) Date of Patent: Nov. 2, 2010

(54) MIXER FOR COOLING AND SEALING AIR SYSTEM OF TURBOMACHINERY

(75) Inventors: Ravi Praveen S. Eluripati, Simpsonville, SC (US); David Wesley Ball, Jr., Easley, SC (US); Kenneth Neil Whaling, Simpsonville, SC (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 919 days.

(21) Appl. No.: 11/711,306

(22) Filed: Feb. 27, 2007

(65) Prior Publication Data

US 2008/0202092 A1 Aug. 28, 2008

(51) Int. Cl.
*F02C 6/04* (2006.01)
(52) U.S. Cl. .................. 60/785; 60/39.23; 60/806; 60/782; 60/795
(58) Field of Classification Search ............ 60/785, 60/39.23, 806, 782, 79.5; 417/151
See application file for complete search history.

(56) References Cited

U.S. PATENT DOCUMENTS

| 3,371,618 A | * | 3/1968 | Chambers | 417/163 |
| 3,625,820 A | * | 12/1971 | Gluntz et al. | 376/372 |
| 5,018,946 A | * | 5/1991 | Breckner et al. | 417/197 |
| 6,550,253 B2 | * | 4/2003 | Mortzheim et al. | 60/782 |

* cited by examiner

*Primary Examiner*—William H Rodríguez
*Assistant Examiner*—Craig Kim
(74) *Attorney, Agent, or Firm*—James W. Pemrick; Ernest G. Cusick; Frank A. Landgraff

(57) ABSTRACT

A system is provided for directing air from plural compressor ports to provide cooling and/or sealing air to an associated turbine site. A first flow from a pressure stage of the compressor has a first pressure and temperature. A second flow from another pressure stage of the compressor has a second pressure and temperature. The first and second pressures/temperatures are different. An ejector has two inlets for receiving the first and second flows, and output for combining the first and second flows into a third flow. The pressure and temperature of the third flow are different from the first and second pressures and temperatures. A bypass line is connected between the first flow and the third flow, and provides a bypass flow. A mixer combines the bypass flow and the third flow into a fourth flow. The fourth flow has a pressure and temperature intermediate the pressure and temperature of the bypass flow and the third flow. The mixer comprises inner and outer sections. The inner section is generally cylindrical in cross section and has a plurality of holes therein. The angle between the direction of the bypass flow and the direction of the third flow, when the bypass flow meets the third flow in the mixer, is less than about 90 degrees.

14 Claims, 3 Drawing Sheets ically the cold and hot day operating conditions. The pressurized air entering the $2^{nd}$ and $3^{rd}$ stage casing manifolds purges the hot turbine air from the $2^{nd}$ and $3^{rd}$ stage wheel space cavities.
MIXER FOR COOLING AND SEALING AIR SYSTEM OF TURBOMACHINERY

BACKGROUND OF THE INVENTION

The present invention relates generally to the cooling and sealing air system in turbomachinery. In particular, the invention relates to a mixer used in the cooling and sealing air system in turbomachinery.

The cooling and sealing air system in a turbomachine (e.g., a turbine) utilizes air from the compressor (e.g., an axial flow compressor) to: (1) cool internal parts of the gas turbine, (2) cool the turbine outer shell and exhaust frame, (3) seal the turbine bearings, (4) prevent compressor pulsation, and (5) provide an air supply for air operated valves.

The following example describes some of the functions of the cooling and sealing air system in an exemplary gas turbine, and is not intended to limit the scope of the present invention in any way. During the startup sequence of a gas turbine, air is extracted from the $9^{th}$ and $13^{th}$ stages of the axial flow compressor and is vented to atmosphere. These $9^{th}$ and $13^{th}$ stage extractions, together with the inlet guide vanes in the closed position, limits airflow through the compressor and prevents compressor pulsation.

During normal operation of the gas turbine, air from the $9^{th}$ and $13^{th}$ stages is used for cooling and sealing $2^{nd}$ and $3^{rd}$ stages of the gas turbine. This is achieved by means of external piping and flow controlling orifices sized to meet the worst case operating requirements of the gas turbine, typically the cold and hot day operating conditions. The pressurized air entering the $2^{nd}$ and $3^{rd}$ stage casing manifolds purges the hot turbine air from the $2^{nd}$ and $3^{rd}$ stage wheel space cavities.

While the turbine is being unloaded or shut down, the cooling and sealing air system continues to cool and seal the turbine wheel space cavities and the interior turbine components. Air from the $9^{th}$ and $13^{th}$ stages of the compressor is again vented through the exhaust plenum. This prevents compressor pulsation during the turbine deceleration period.

The diverted air from the axial flow compressor can consume a large proportion of the total air flow through the compressor, for example, as much as 20%. The management and control of these parasitic flows can dramatically increase the performance of the turbine. The extraction ports often provide cooling air flow at too high a pressure and/or temperature and typically the flow is throttled, resulting in a net loss of energy. By employing an ejector, the low pressure/temperature flow (e.g., from the $9^{th}$ compressor stage) may be mixed with the high pressure/temperature flow (e.g., from the $13^{th}$ compressor stage) to provide a flow at an intermediate pressure and temperature substantially matching the pressure and temperature required to cool a turbine component, while simultaneously making use of low pressure and temperature air which otherwise might be dissipated as wasted energy.

An ejector in a cooling and sealing air system of a gas turbine helps in reducing the usage of expensive (i.e., in terms of work expended) high-pressure air by replacing it with relatively inexpensive low-pressure air. The ratio of the mass flow of low-pressure air pumped by the ejector by expending a pound of high-pressure air is called the entrainment ratio. For maximum benefit of the ejector system, a high entrainment ratio is expected over all operating conditions of the gas turbine. Depending on the cooling flow requirement of the turbine, bypass flow is needed at several operating conditions. A high entrainment ratio improves overall gas turbine performance (both efficiency and output).

Ejectors, however, have no moving parts and are designed for operation at specific design points based on ISO day conditions. ISO standard day conditions are 59° F., 14.7 psia, 60% relative humidity or 15° C. (288° K), 101.3 kilopascals, 60% relative humidity. For turbine applications, the turbine inlet conditions to the ejector are a function of ambient day conditions in which the turbomachinery operates. The ambient day variations seen by the gas turbine can vary, for example, from −20° F. to +120° F., which results in about a 50% temperature and about 50% pressure variation on the inlet/exit conditions to the ejector. This variation has a strong effect on the operational characteristics of the ejector to the extent that, at many ambient day conditions, the ejector will not provide adequate cooling and/or purge flow. That is, the ejector behaves differently on different days and at different times during each day, and on certain days, the ejector will provide insufficient benefit.

BRIEF DESCRIPTION OF THE INVENTION

In one aspect of the invention, a system is provided for directing air from plural ports in a compressor to direct cooling and/or sealing air to an associated turbine site for optimizing turbine performance. A first flow from a pressure stage of the compressor has a first pressure and a first temperature, a second flow from another pressure stage of the compressor has a second pressure and a second temperature. The first pressure and temperature are different than the second pressure and temperature. An ejector has a first inlet for receiving the first flow and a second inlet for receiving the second flow, and an output for combining the first and second flows into a third flow. The third flow has a third pressure and a third temperature, that is different from the first and second pressures and temperatures. A mixer comprised of two cylindrical sections combines the first flow and the third flow to provide a fourth flow. A plurality of holes are formed in the inner cylindrical section. The fourth flow has a pressure and temperature intermediate the pressure and temperature of the first and third flows. The mixer has a first mixing input for receiving the third flow, and a second mixing input for receiving the first flow. The angle between the direction of the first flow and the third flow, when the two flows meet is less than 90 degrees.

In another aspect of the invention a system is provided for mixing flows from a compressor. An ejector receives a first flow and a second flow from the compressor, and combines the first and second flows into a third flow. The first flow has a first pressure and a first temperature, and the second flow has a second pressure and a second temperature. The first and second pressures are different and the first and second temperatures are different. A mixer comprised of a first concentric member and a second concentric member, combines the first and third flows to provide a fourth flow. A portion of the first concentric member is contained within the second concentric member. The fourth flow has a pressure and temperature intermediate the pressure and temperature of the first and third flows.

In another aspect of the invention a system is provided for mixing flows from a compressor. An ejector receives a first flow and a second flow from the compressor, and combines the first and second flows into a third flow. A mixer combines the first flow and third flows into a fourth flow. The mixer is comprised of a first inner member and a second outer member. A portion of the first inner member is located within the second outer member. In addition, the first inner member has a plurality of holes that are used to mix the first flow with the third flow.

DETAILED DESCRIPTION OF THE INVENTION

Figure 1:
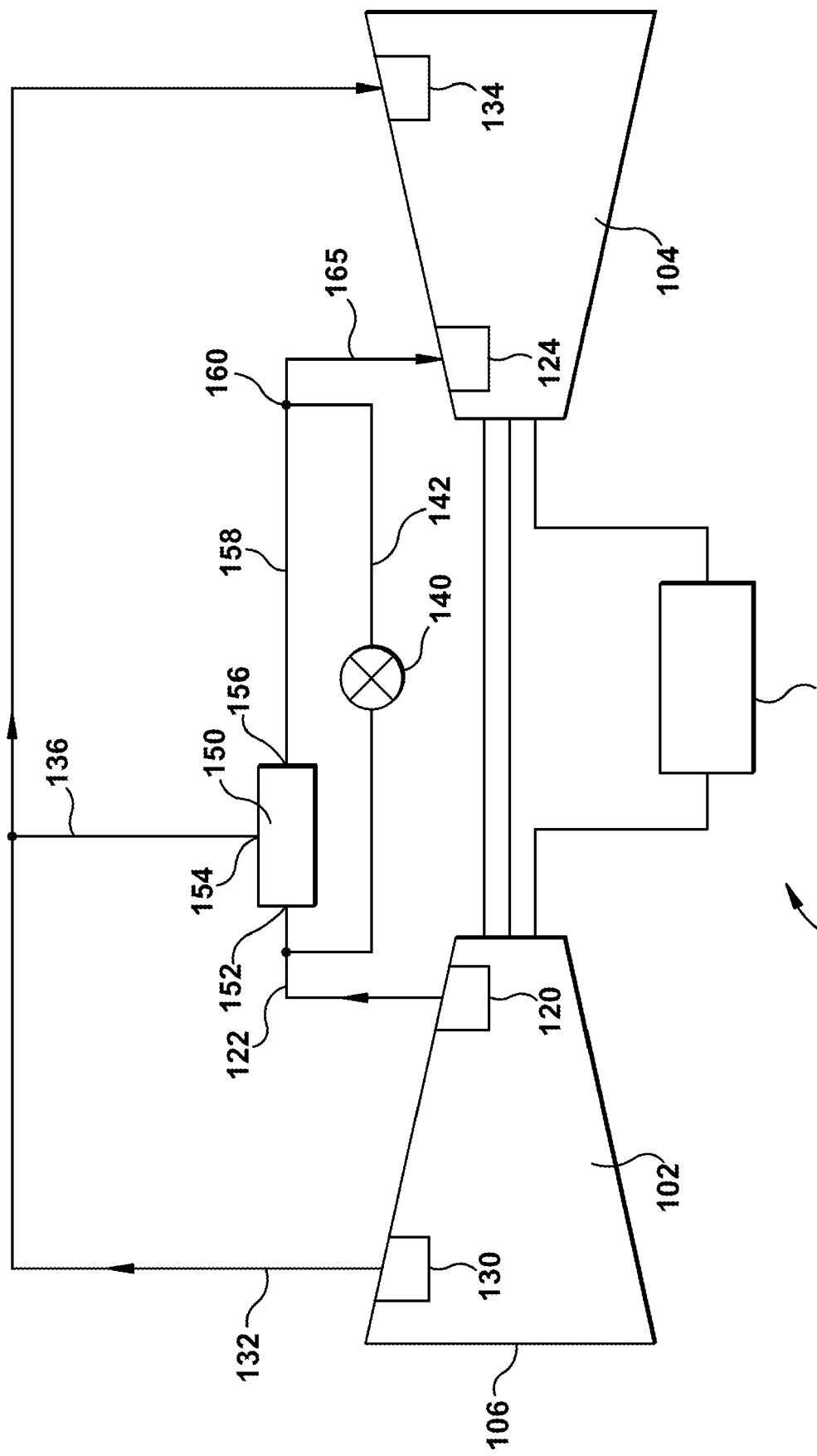
FIG. 1 is a schematic illustration of compressor and turbine sections and the cooling and sealing air system of an exemplary turbomachine.

Referring now to the drawings, particularly to FIG. 1, there is illustrated an exemplary turbomachine, generally designated 100, including a compressor 102 and a turbine 104. The compressor 102 has an inlet 106 for receiving ambient air that is subsequently compressed through a number of different stages of the compressor 102, each stage compressing the air to higher pressures and temperatures. The compressed air is primarily for delivery to combustors 108 where the pressurized air is combined with fuel and combusted to provide hot gases of combustion to the various stages of the turbine 104. Bleed air is typically removed from various stages of the compressor for use as cooling/purge air flow in the turbine 104. Thus, a portion of the compressor 102 air flow is diverted from flow through the combustors 108 for these other purposes. For example, cooling air is often provided to the nozzles of the turbine 104. In FIG. 1, and as a representative example, high pressure air extraction is taken from the 13th stage 120 of compressor 102 and provided as cooling air flow to a first site 124 of the turbine 104, e.g., a second stage nozzle, via a flowpath 122. Similarly, bleed air is extracted from an earlier stage, e.g., the 9th stage 130 of compressor 102, and supplied via flowpath 132 as cooling air to a second site 134 of the turbine, e.g., a third stage nozzle. A throttling valve 140 is provided in a bypass flowpath 142 for purposes explained below.

An ejector 150 is employed in flowpath 122 which effectively eliminates the need to dissipate bleed air pressure across an orifice or similar device in flowpath 132 and enables mixing of bleed air from flowpaths 122 and 132 to adjust extraction flows to optimize machine performance. An ejector 150 is a mechanical device with no moving parts or required external energy input which mixes two fluid streams based on a momentum transfer. The ejector 150 has an inlet 152 for the high pressure motive fluid received via line 122, an inlet 154 for the low pressure or suction fluid received via a flowpath 132, 136.

By locating the ejector 150 in the flowpath 122, the high pressure extraction flow from the 11th stage 120 of the compressor 102 serves as the motive flow at inlet 152. The lower pressure, lower temperature flow via flowpath 132 flows to the ejector 150 via a crossover flowpath 136 and serves as the suction flow via inlet 154. Thus, the two flows are mixed together and flow through the outlet 156 of the ejector 150 forming a third flow 158 at a pressure and temperature intermediate the pressure and temperature of the respective motive and suction flows. It will be appreciated that the ejector, therefore, has no moving parts and is designed to operate at a specified design point based on ISO day conditions. Because the inlet conditions and hence the characteristics of the flows supplied to the ejector are a function of ambient day conditions, the operational characteristics of the ejector are affected and the ejector behaves differently as a function of time and atmospheric conditions.

The performance of a fixed nozzle ejector is optimum at a fixed set of operating conditions (i.e., inlet & exit pressures and temperatures). However, the extraction pressures of a gas turbine compressor 102 (i.e., the motive and suction pressures of the ejector 150) and the required cooling flow supply pressure of a turbine 104 (i.e., the discharge pressure of ejector 150) vary with ambient temperature and operating load. The optimum operating conditions for ejector 150 occur when the ambient temperature is above 70° F. and at part loads (e.g., below 50% load on turbine 104). Therefore, at cold day operating conditions (i.e., less than 70° F. ambient temperature), it is required to provide a bypass line 142 parallel to the ejector 150 to provide additional cooling flow required by the turbine 104 that the ejector 150 cannot supply alone.

Figure 2:
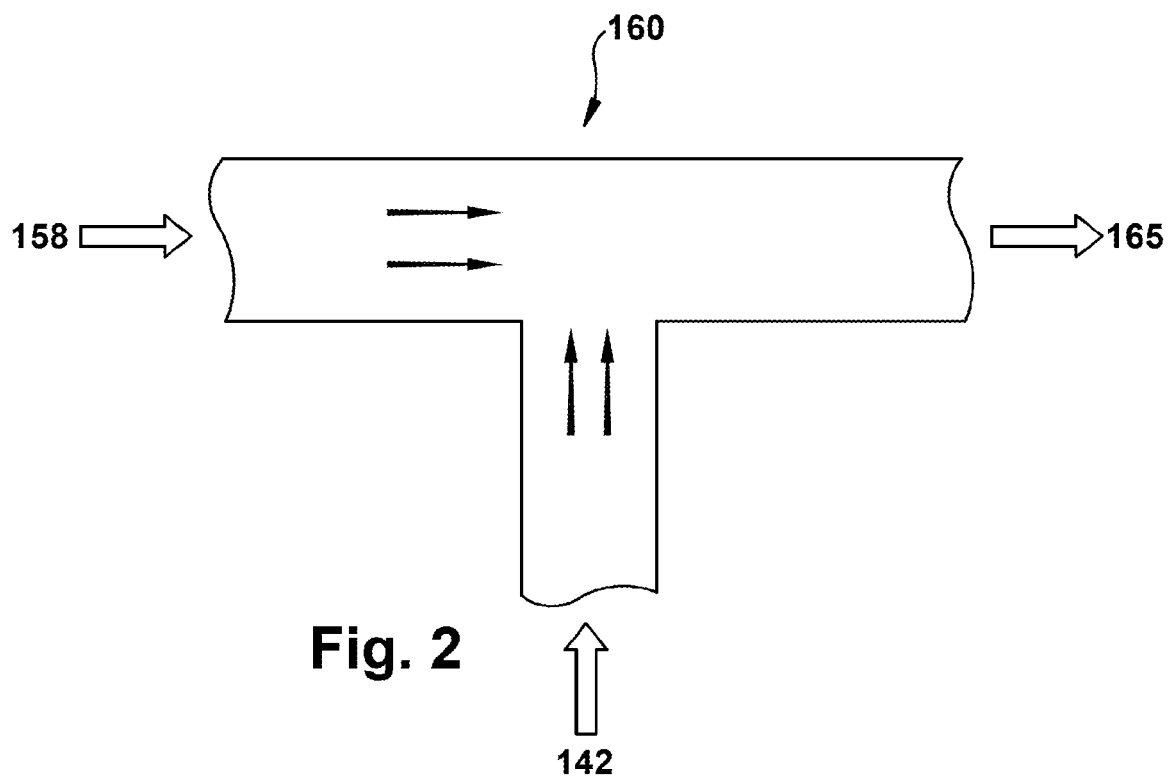
FIG. 2 is an enlarged cross-sectional view of the T junction mixer used in the cooling and sealing air system of the exemplary turbomachine illustrated in FIG. 1.

The conventional method of mixing ejector output 158 and bypass flow 142 uses a standard T junction. The T junction is illustrated at 160 in FIGS. 1 and 2. Referring to FIG. 2, the T junction 160 mixes the ejector output 158 and the bypass flow 142 at right angles. The output of the T junction 160 is indicated by 165 in FIG. 1 and FIG. 2. When the two flows are mixed at a 90° angle, the overall velocity of the combined output flow 165 is reduced. This leads to higher backpressure on the ejector 150. The performance of the ejector 150 is a strong function of the ejector discharge pressure, and the conventional method leads to low or no entrainment at cold day operating conditions. A better method and apparatus, as embodied by the invention, to mix ejector output 158 and bypass flows 142 that lead to lower ejector discharge pressure causing higher performance benefits during cold day & part load operating conditions, is herein described.

Figure 3:
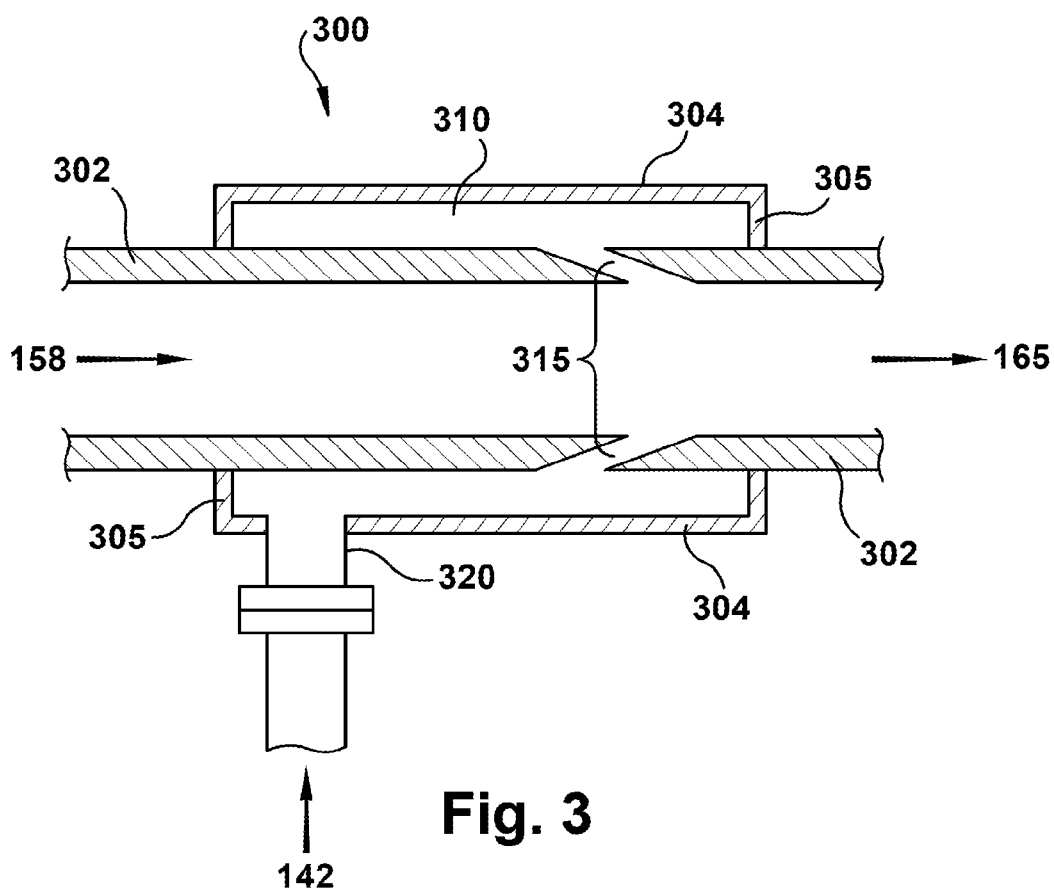
FIG. 3 is a cross-sectional view of one embodiment of the improved mixing junction used in the cooling and sealing air system of the exemplary turbomachine illustrated in FIG. 1.

FIG. 3 illustrates an improved mixing junction 300, as embodied by the invention, for mixing ejector and bypass flows instead of using a standard T component 160. The output of the ejector is indicated at 158 and the bypass flow is indicated at 142. The combined ejector and bypass flows exit the mixing junction 300 at 165. In one example, the mixing junction 300 is comprised of two concentric cylindrical pipe members 302 and 304. The inner pipe section 302 accepts the flow output from the ejector, indicated at 158, and outputs the combined ejector flow and bypass flow at 165. The outer pipe section 304, together with end sections 305, form a chamber 310 around inner pipe section 302. Bypass flow 142 is input into this chamber 310 via input coupling 320.

A plurality of angled holes 315 are formed in the wall of inner pipe section 302. The holes 315 provide a channel between chamber 310 and the interior of inner pipe section 302. Only two holes are shown in the cross section illustrated by FIG. 3, but any number of holes could be placed in pipe 302. It is preferred to have an odd number of holes, equally distributed about the circumference of the pipe, to reduce the interaction between opposing flow streams, and depending on the size of the pipe, 3 to 25 holes or more can be utilized. However, the holes 315 can be randomly spaced as well. The preferred cross sectional shape of the holes is round or circular, but any other shape, such as, rectangular, oval, etc., could be used as well. The size of the holes can be varied and different sized holes can be used simultaneously to improve the flow characteristics of the mixer 300. The angle holes 310 make with respect to the inner wall of pipe section 302 is preferably between about 0 to about 50 degrees, or more preferably between about 10 degrees to about 45 degrees.

High pressure/temperature flow from bypass line 142 enters chamber 310 and is then forced through angled holes 315. The angled holes 315 enable ejector flow 158 and bypass flow 142 to mix at a small angle to their respective flow directions. As bypass flow 142 does not decelerate the primary ejector flow, all the pressure available in bypass line 142 can be effectively utilized to reduce ejector back pressure, in turn improving over all entrainment ratio. The high velocity of the bypass flow 142 passing through angled holes 315 also helps to reduce the pressure drop for ejector flow across mixer 300. This is equivalent to lowering the discharge pressure and enhances the performance of the ejector 150.

Figure 4:
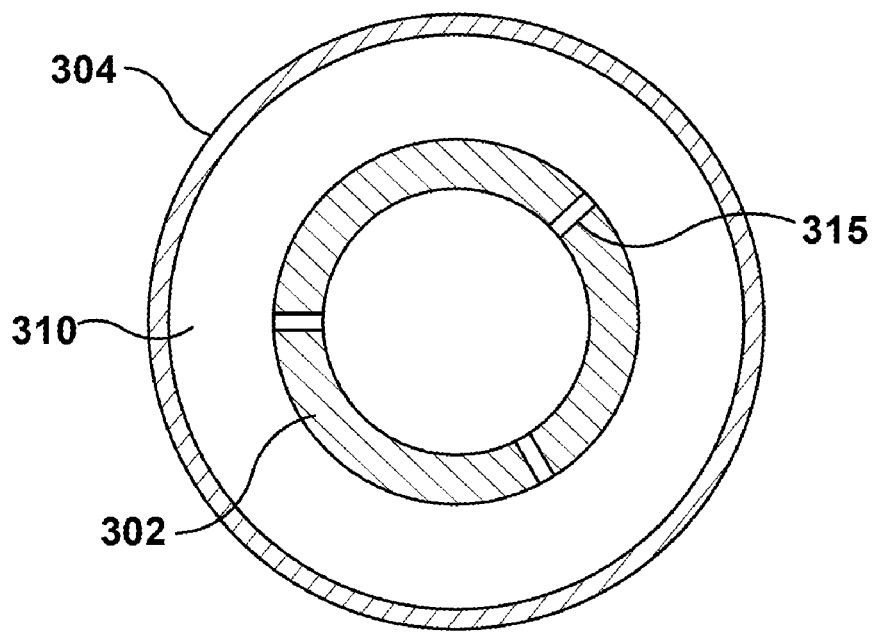
FIG. 4 is a perspective view of one exemplary embodiment of a nozzle tip that may be used with the mixing junction shown in FIG. 3.

In another aspect of the invention, inner pipe 302 can be made thicker than outer pipe 304, or vice-versa. The placement of inner pipe 302 within outer pipe 304 can also be varied. FIG. 4 shows an example, in cross-section, where inner pipe 302 is centered (i.e., centrally disposed) within outer pipe 304. Three holes 315 are shown in this embodiment, but it is to be understood that this is for clarity only, and any number of holes can be placed in pipe 302. In addition, the spacing of the holes can be uniform or non-uniform, as well as staggered along an axial line of pipe 302. Only one row of holes 315 are illustrated, but multiple rows of holes could be employed as well. Multiple rows of holes 315 could be axially spaced along the longitudinal direction of pipe 302.

Figure 5:
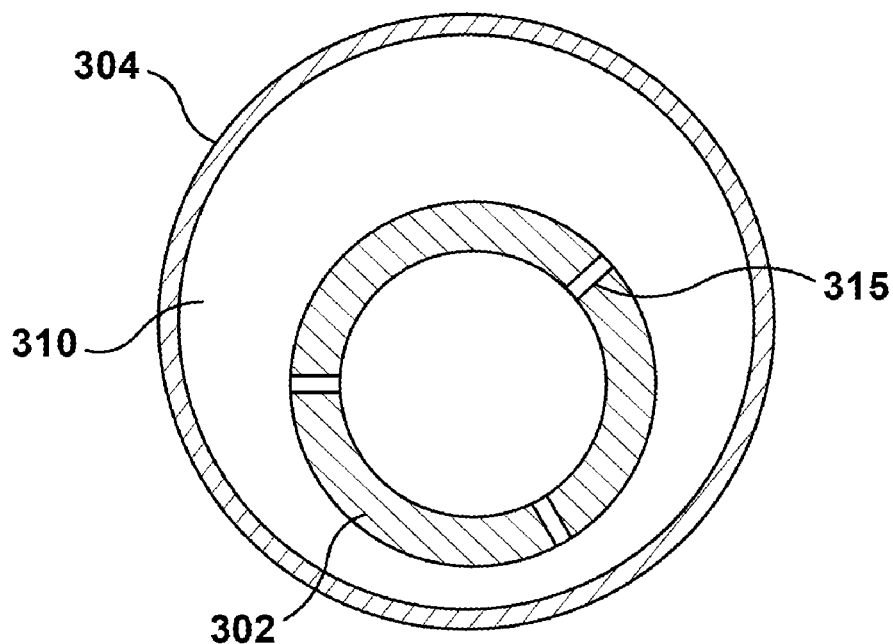
FIG. 5 is a perspective view of a cooling flow stream discharged from the nozzle tip shown in FIG. 4.

FIG. 5 illustrates another example, in cross-section, where inner pipe 302 is located eccentrically (i.e., eccentrically disposed) within outer pipe 304. This design can be used to alleviate pressure unevenness within chamber 310. In some applications, the pressure at each respective hole 315 can be different due to the flow pattern of high pressure bypass flow 142 within chamber 310. By changing the position of inner pipe 302 (e.g., locating inner pipe 302 eccentrically within outer pipe 304), the pressure (and therefore the flow) experienced at each hole 315 can be made more uniform.

The mixer 300 can mix two fluid flows having different pressures and temperatures, with a very minimum pressure drop. The pressure drop is an important aspect for the final performance of the turbomachine system 100. In some instances, high pressure fluid flow enters the chamber 310, and the internal shape of the chamber 310 may create reverse flows (e.g., some flow changes direction and works against itself). These flow changes are referred to as vortices in the flow, and they can interfere with a smooth flow. To alleviate the problem of vortices, flow restrictors (not shown in the drawings) can be installed in chamber 310. In one embodiment of the present invention, the flow restrictors can be small metal tabs that are attached (e.g., by welding, screwing, fastening, or with adhesive) to the inside of chamber 310. The flow restrictors disrupt the vortices and provide for a smooth flow within chamber 310.

Overall, this configuration minimizes the pressure drop due to two stream mixing, and results in improved utilization of available high velocity bypass flow to reduce pressure at ejector discharge.

While the invention has been described in connection with what is presently considered to be one preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for directing air from plural ports in a compressor to provide cooling and/or sealing air to an associated turbine site, the system comprising:
   a first flow from a pressure stage of the compressor, said first flow having a first pressure and a first temperature,
   a second flow from another pressure stage of the compressor having a second pressure and a second temperature, wherein said second pressure and temperature are different than said first pressure and temperature,
   an ejector having a first inlet for receiving the first flow and a second inlet for receiving the second flow, said ejector having an ejector output for combining the first and second flows into a third flow, said third flow having a third pressure and a third temperature, wherein said third pressure and temperature are different from said first and second pressures and temperatures,
   a bypass line connected between said first flow and said third flow, said bypass line providing a bypass flow,
   a mixer for combining the bypass flow and the third flow to provide a fourth flow, said mixer comprising an inner section and an outer section, said inner section generally cylindrical in cross section and having a plurality of holes circumferentially disposed therein, each of said holes having an axial direction, said fourth flow having a pressure and temperature intermediate the pressure and temperature of said bypass flow and said third flow, said mixer having a first mixing input receiving the third flow, and a second mixing input receiving the bypass flow, wherein an angle between the axial direction of each of the holes and the direction of said third flow, is more than 0 degrees and less than 90 degrees.

2. A system according to claim 1, wherein the angle between the axial direction of each of the holes and the direction of said third flow, is between 0 and about 45 degrees.

3. A system according to claim 2, wherein said mixer includes an odd number of holes in said inner section.

4. A system according to claim 1, wherein an angle between an inner section axial direction and the axial direction of each of the holes is less than about 50 degrees.

5. A system for mixing flows from a compressor, the system comprising:
   an ejector for receiving a first flow and a second flow from said compressor, and an ejector output for combining said first and second flows into a third flow,
   said first flow having a first pressure and a first temperature, and said second flow having a second pressure and a second temperature, wherein said first and second pressures are different and said first and second temperatures are different,
   a bypass connected between said first flow and said third flow, said bypass providing a bypass flow,
   a mixer for reducing back pressure on the ejector output and combining said bypass flow and said third flow to provide a fourth flow, said fourth flow having a pressure and temperature intermediate said pressure and temperature of the bypass flow and the third flow, said mixer comprising a first concentric member and a second concentric member, a portion of said first concentric member contained within said second concentric member;
   wherein said first concentric member has a plurality of holes circumferentially disposed therein for allowing said bypass flow to mix with said third flow, each of the plurality of holes having an axial direction, an angle between the axial direction of each of the plurality of holes and an axial direction of the first concentric member is more than 0 degrees and less than 90 degrees.

6. The system for mixing flows according to claim 5, wherein each of said plurality of holes are configured to pass from an exterior surface of said first concentric member to an interior surface of said first concentric member, wherein, the angle between the axial direction of each of the plurality of holes and an axial direction of the first concentric member is between 0 degrees and about 50 degrees.

7. The system for mixing flows according to claim 6, wherein the angle between the axial direction of each of the plurality of holes and an axial direction of the first concentric member is between about 10 degrees and about 45 degrees.

8. The system for mixing flows according to claim 5, wherein said first concentric member is centrally disposed within said second concentric member.

9. The system for mixing flows according to claim 5, wherein said first concentric member is eccentrically disposed within said second concentric member.

10. A system for mixing flows from a compressor, the system comprising:
   an ejector for receiving a first flow and a second flow from said compressor, and an ejector output for combining said first and second flows into a third flow,
   a bypass connected between said first flow and said third flow, said bypass providing a bypass flow,
   a mixer for combining said bypass flow and said third flow to provide a fourth flow, wherein the mixer comprises a first inner member and a second outer member, a portion of said first inner member is located within said second outer member,
   said first inner member having a plurality of holes circumferentially disposed therein, each of said plurality of holes having an axial direction, said plurality of holes allowing the bypass flow located within said second outer member to mix with the third flow located within said first inner member;
   wherein, an angle between the axial direction of each of the plurality of holes and an axial direction of the first inner member is more than 0 degrees and substantially less than 90 degrees, and the bypass flow intersects with said third flow at a mixing angle that reduces back pressure on the ejector output.

11. The system for mixing flows according to claim 10, wherein each of said plurality of holes are configured to pass from an exterior surface of said first inner member to an interior surface of said first inner member,
   wherein, the angle between the axial direction of each of the plurality of holes and the axial direction of the first inner member is between 0 degrees and about 50 degrees.

12. The system for mixing flows according to claim 11, wherein the angle between the axial direction of each of the plurality of holes and the axial direction of the first inner member is between about 10 degrees and about 45 degrees.

13. The system for mixing flows according to claim 10, wherein said first inner member is centrally disposed within said second outer member.

14. The system for mixing flows according to claim 10, wherein said first inner member is eccentrically disposed within said second outer member.

* * * * *